United States Patent
Rosset et al.

(10) Patent No.: US 6,904,520 B1
(45) Date of Patent: *Jun. 7, 2005

(54) METHOD AND SYSTEM FOR ENSURING THE SECURING OF COMPUTER SERVERS OF GAMES

(75) Inventors: Franck Rosset, Paris (FR); Alain Gayet, Courbevoie (FR); Jean Moulin, Paris (FR)

(73) Assignee: Fintel S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,349

(22) PCT Filed: Sep. 25, 1997

(86) PCT No.: PCT/FR97/01687

§ 371 (c)(1),
(2), (4) Date: May 3, 1999

(87) PCT Pub. No.: WO98/13972

PCT Pub. Date: Apr. 2, 1998

(30) Foreign Application Priority Data

Sep. 25, 1996 (FR) .............................. 96 11916

(51) Int. Cl.$^7$ ............................................. G06F 15/28
(52) U.S. Cl. ....................... 713/151; 713/151; 380/277; 379/123; 379/130; 379/144.05; 705/39
(58) Field of Search ........................... 713/151; 380/27, 380/277; 379/123, 130, 144.05, 144; 705/39

(56) References Cited

U.S. PATENT DOCUMENTS

| | | | | |
|---|---|---|---|---|
| 4,339,798 A | * | 7/1982 | Hedges et al. ............. | 380/277 |
| 4,707,592 A | | 11/1987 | Ware | |
| 4,928,098 A | | 5/1990 | Dannhaeuser | |
| 4,998,279 A | | 3/1991 | Weiss | |
| 5,136,632 A | * | 8/1992 | Bernard ..................... | 379/123 |
| 5,406,619 A | * | 4/1995 | Akhteruzzaman et al. .... | 379/95 |
| 5,583,933 A | * | 12/1996 | Mark ......................... | 379/355 |
| 5,633,920 A | * | 5/1997 | Kikinis et al. .............. | 379/130 |
| 5,790,644 A | * | 8/1998 | Kikinis ....................... | 379/144 |
| 6,377,670 B1 | * | 4/2002 | Rosset et al. .......... | 379/144.05 |

FOREIGN PATENT DOCUMENTS

| | | |
|---|---|---|
| CA | 2085775 | 6/1994 |
| DE | 43 25 459 | 2/1995 |
| EP | 0 360 732 | 3/1990 |
| EP | 0 374 012 | 6/1990 |
| EP | 0 423 035 | 4/1991 |
| EP | 0 459 781 | 12/1991 |
| EP | 0 609 143 | 8/1994 |

(Continued)

*Primary Examiner*—Emmanuel L. Moise
*Assistant Examiner*—Taghi T. Arani
(74) *Attorney, Agent, or Firm*—Merchant & Gould P.C.

(57) ABSTRACT

The invention concerns a method and a system enabling gamesters (11) of a virtual casino to accede safely and rapidly, by means of a microphone (17) connected to a communication network (15), to the different games that the virtual casino (12) offers to its gamesters (11). The method comprises the following steps: the virtual casino provides each of its gamesters (11) with a card (10), formatted like a credit card, personalised by specific identifiers for each card and each gamester; said card (10) emits brief identifying sound signals (20), of the DTMF type, at least partly encrypted, varying with each operation, when it is actuated (14) by the gamester (11); said identifying sound signals are received by the microphone (17) and transmitted by the communication network (15) to the computer service (18) of the virtual casino; the transmitted signals and the identification data of the gamester and the card in the possession (23) of the computer service (18), are electronically processed (24) and compared (25) by the computer service (18) of the virtual casino, such that in the event of coincidence, the gamester (11) can immediately be put through to the services (30) which the virtual casino offers to the gamesters.

8 Claims, 2 Drawing Sheets

FOREIGN PATENT DOCUMENTS

| | | |
|---|---|---|
| EP | 0 695 076 | 1/1996 |
| FR | 2 701 181 | 8/1994 |
| GB | 2 274 523 | 7/1994 |
| JP | 63-211843 | 9/1988 |
| WO | WO 82/04169 | 11/1982 |
| WO | WO 88/03294 | 5/1988 |
| WO | 96/04741 | 2/1996 |
| WO | WO 96/31971 | 10/1996 |
| WO | WO 97/03421 | 1/1997 |
| WO | WO 97/12471 | 4/1997 |

* cited by examiner

METHOD AND SYSTEM FOR ENSURING THE SECURING OF COMPUTER SERVERS OF GAMES

The field of the invention is that of remote services.

More precisely, the invention relates to a method and system enabling the gamblers of a virtual casino (or all kinds of service providers offering games: played individually or in groups), to access securely and rapidly, by means of a microphone linked to a communications network, the different games that the virtual casino offers to its gamblers.

The problem that arises is to prevent a dishonest user from accessing the virtual casino without being authorized to do so, without paying the corresponding fee or by pretending that he did not participate in the games played for money he is debited for by the virtual casino.

To solve this problem, it has been proposed to use access keys generated by memory cards and to modify handsets to that they can read the memory cards. In addition to their cost, these solutions are not very convenient and lengthy to implement. In fact, the problem that arises can be solved effectively only if one is capable of solving another problem at the same time: how to design a convenient to use method and system, fast to implement and economical. Indeed, from the moment a large audience is addressed, ease of use and time savings become major problems that cannot be dismissed.

It has been proposed (document FR 2 702 181 in the name of Lucas GOREETA, document WO 96 04741 in the name of Andrew MARK) to use a card emitting DTMF type encrypted acoustic signals. Thus, the holder of a card of this type can couple it to the microphone in the telephone handset to automatically transfer his identifiers to the computer services of the virtual casino. Since these identifiers are encoded, it may be thought that a third party will not be able to understand the contents. However, the recording of the signals emitted by the card remains possible and a defrauder in possession of this type of recording could substitute himself for the card holder.

Therefore, the solutions of L. GORETA and A. MARK do not allow preventing a dishonest user to access, without being authorized to do so, the computer services of the virtual casino.

Patent application DE A 4 325 459 filed in the name of Raymund H. EISELE describes a pocket calculator emitting acoustic identification signals, varying for each operation. Therefore, there is no point in a defrauder recording this type of acoustic signal. However, its large size, the fact that it is cumbersome and inconvenient to use and its high cost price prevent it from satisfying the objectives of this invention. I.e.: to design a method and system that are convenient to use and can be quickly and economically installed. In fact, a gambler would only accept to remote plan in a virual casino if the access thereto is easy and fast.

The objectives aimed at by the present invention are achieved and the problems posed by the techniques according to prior art are solved, according to the invention, using a method comprising the following steps:

the virtual casino supplies to each of its gamblers with a credit-card sized card, customized by identifiers specific to each card and each subscriber, said card emits short acoustic DTMF type identification signals, encrypted at least partially, varying for each operation, when it is activated by the gambler, said acoustic identification signals are received by the microphone of the multimedia terminal and transmitted via the communications network to the computer service of the virtual casino, the signals transmitted and the identification data of the gambler and the card stored by the computer service are processed and compared electronically by the computer service of the virtual casino.

Thus, thanks to this method, the virtual casino can check that the caller actually has an authentic card and not a computer artifice. It could also identify the card holder as being a person authorized to use the services it offers. Consequently, in case of a match, the gambler is immediately put through to the voice server or the operator of the virtual casino. In addition, defrauders no longer have the possibility to steal the identification data as they are transmitted automatically in encrypted form. Furthermore, the recording, whatever form it may be in, of the acoustic signals will be of no use to a defrauder for obtaining identification by the virtual casino. Indeed, the acoustic identification signals vary for each operation. I.e., each time the card is activated.

Preferably, said card:

furthermore counts the number of times $C(p,n)$ it is activated, emits acoustic signals representative of the number of times $C(p,n)$ it has been activated, encrypts the acoustic signals depending on the number of times $C(p,n)$ it has been activated.

Also preferably, said computer means for electronically processing and comparing the signals transmitted and the identification data of the gambler and the card stored by the computer service of the virtual casino, store the number of times $C(p,m)$ the card has been activated during the last operation validated, compare the number of times $C(pin)$ the card has been activated, during the current operation, to the number of times stored Nl, refuse the current operation if $C(pin)$ is less than or equal to $C(p,m)$ and continue the verification of the current operation if $C(p,n)$ is greater than $C(p,m)$, recalculate the electronic signals $S'(p,n)$ depending on the identification data and the number of times $C(p,n)$ the card has been activated, during the current operation, then compare them to the electronic signals $S(p,n)$ transmitted. Consequently, in case of a match, the gambler can access the games offered by the virtual casino.

It will be noted in this respect, that the use of a microcircuit to encrypt, by means of a counter, identification codes exchanged between an emitter and a receiver, was described in patent application: EP 0 459 781 A1 filed in the name of NANOTEK LIMITED.

In view of increasing security, in an alternative embodiment, the method further comprises the following step: the gambler emits a confidential code using a keypad linked to the handset and/or the card. After transmission to the computer service of the virtual casino, via the communications network, this confidential code is processed and compared to the gambler's personal confidential code stored by the computer service of the virtual casino.

Thus, the virtual casino is sure that the caller actually is the person authorized to get in touch with his services. A stolen card cannot be used by the thief because he does not know the confidential code.

In another alternative embodiment, also in view of reinforcing the security of the method and avoiding that the gambler can question the order he has placed with the virtual casino, the method further comprises the following step:

the orders the gambler placed with the virtual casino are validated by the gambler activating the card so that it emits an encrypted acoustic validation signal, said validation signal is recorded by the computer service of the virtual casino.

Advantageously, the method according to the invention may comprise the following additional step:

an acknowledgement of receipt of the validation signal is sent to the gambler.

Thanks to this method, the gambler has validated, with an electronic signature, the order he has placed with the virtual casino.

The invention also relates to a system enabling the gamblers of a virtual casino to access securely and rapidly the different games the virtual casino offers to its gamblers. This system is characterized in that it comprises the means for implementing the above defined method and its alternative embodiments.

More in particular:

The system according to the invention comprises a credit-card sized card, customized by identifiers specific to each card and each gambler, supplied to them. Said card comprises a means for emitting short acoustic identification signals. These emission means are activated by the gambler by means of an element accessible from outside the card. The card further comprises an encryption means for encrypting at least partially and varying the acoustic signals each time the card is activated.

The system according to the invention comprises a means for receiving and converting acoustic signals, namely a handset microphone, into electronic signals that can be remote transmitted by means of a communications network.

The system according to the invention comprises a computer means, part of the computer service of the virtual casino, connected to the communications network and located at a distance from the means receiving the acoustic signals, said computer means comprising:

a database containing the references of the cards and the gamblers and their identification data, a means for processing and a means for comparing the electronic signals and the identification data contained in the database.

Thus, thanks to this system, the virtual casino can check that the caller actually has an authentic card and not a computer artifice. It could also identify the card holder as being a person authorized to use the services it offers. Consequently, in case of a match, the gambler is immediately put through to the voice server or the operator of the virtual casino. In addition, defrauders no longer have the possibility to steal the identification data as they are transmitted automatically in an encrypted form. Furthermore, the recording, whatever form it may be in, of the acoustic signals will be of no use to a defrauder for obtaining identification by the computer services of the virtual casino. Indeed, the acoustic identification signals vary for each operation. I.e., each time the card is activated.

Preferably, said card further comprises:

an incremental counter interconnected to emission means and encryption means, incrementing at least by one unit each time the card is activated.

Consequently, the state of the incremental counter is emitted to the computer means and the acoustic signals are encrypted depending on the state of the incremental counter.

Also preferably, said computer means further comprises:

a means for storing the state C(p,m) of the incremental counter during the last operation validated, a means for comparing the state C(p,n) of the incremental counter, emitted during the current operation, to the stored state C(p,m) of the incremental counter.

Consequently, the verification of the current operation is rejected if C(p,n) is less than or equal to C(p,m) and continues if C(p,n) is strictly greater than C(p,m).

Also preferably, said means for processing and said means for comparing the electronic signals and the identification data contained in the database comprise a means for recalculating the electronic signals depending on the state C(p,n) of the incremental counter and the identification data, then comparing them to the electronic signals transmitted. Consequently, in case of a match, the gambler can immediately access the different games offered by the virtual casino.

In view of increasing the security of the system, in an alternative embodiment, the system further comprises a second means for comparing a gambler's personal confidential code, contained in the database, to a confidential code emitted by the gambler. This code is emitted by means of a keypad linked to the handset and/or the card and transmitted to the computer means of the virtual casino, via the communications network.

Thus, the virtual casino can check that the caller is actually the person authorized to participate in the games. A stolen card cannot be used by the thief because he does not know the confidential code.

In another alternative embodiment, also in view of reinforcing the security of the system and avoiding that the gambler can question the order he placed with the virtual casino, the system according to the invention is such that:

said card further emits, when it is activated by the gambler of the virtual casino, an encrypted acoustic signal validating the orders placed by the gambler, said software means further comprise means for detecting and recording the validation signal.

Thanks to this system, the gambler has validated, with an electronic signature, the order he has placed with the virtual casino.

Advantageously, in this case, the computer means further comprises means for emitting an acknowledgement of receipt for the orders placed, to be sent to the gambler.

Other features and advantages of the invention will appear when reading the description of the alternative embodiments of the invention, provided by way of an illustrative and not restrictive example.

Figure 1:
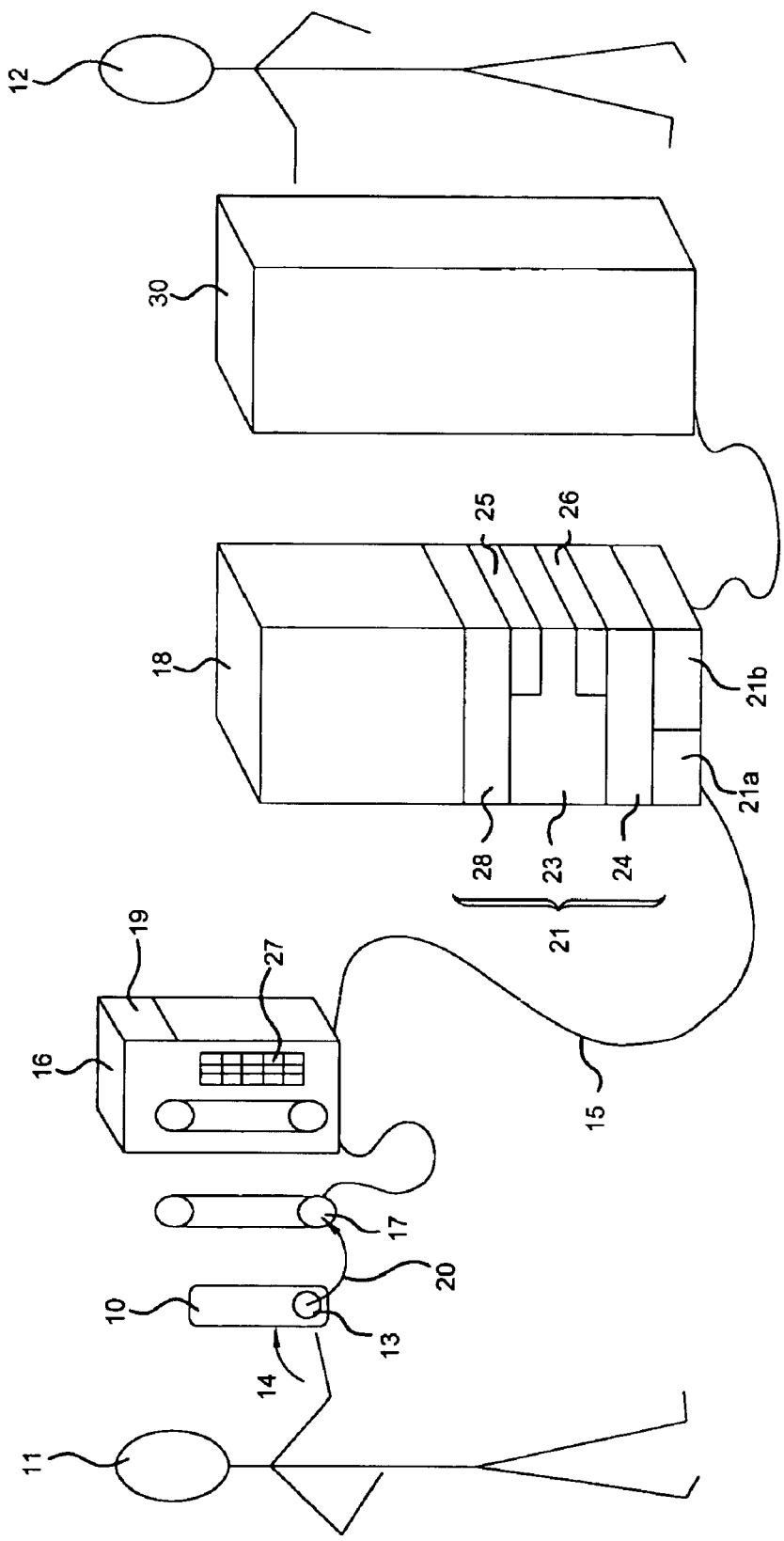
FIG. 1 shows a schematic perspective view of the system and the method according to the invention.

The system and method according to the invention enable the gambler 11 to call, securely and rapidly, namely by means of a handset 16 comprising a microphone 17, the services (different games) 30 that the virtual casino 12 offers to its gamblers 11. The handset 16, located at a distance from the computer services 18 of the virtual casino, is connected to the computer services 18 via a communications network 15.

The system comprises a credit-card sized card 10, customized by identifiers specific to each card and each gambler 11. This card is supplied to the gamblers 11 by the virtual casino. Card 10 comprises an emission means, namely a loudspeaker 13 emitting short acoustic identification signals 20, of DTMF type. These signals are emitted when the emission means 13 and the elements that control it are activated by the gambler by means of a button 14 accessible from outside the card (not visible in FIG. 1 because it is located on the other side of the card). This emission means 13 is energized by a DTMF signal generator 99, controlled by a microprocessor 104 powered by a battery 106 and driven by a resonator 107. The microprocessor 104 contained in the card comprises an encryption means 103 allowing to encrypt, at least partially, the acoustic signals 20, comprising an encryption algorithm 108 and identifiers 109 specific to each card 10 and each gambler 11, namely the secret key 250 used by the encryption algorithm 108.

Acoustic signals 20 are received by the microphone 17 of the handset, against which the gambler places card 10. The system also comprises an acoustic signal 20 transmitting means 19, located inside handset 16. This transmission means 19 remote transmits the acoustic signals, when they have been processed and converted into electronic signals, via the communications network 15.

The system also comprises a computer means 21, part of the computer services 18 of the virtual casino. This computer means is connected to the communications network 15 and located at a distance from the handsets 16. This computer means 21 in turn comprises:

a database 23 containing the references of the cards and the gamblers and their identification data, a means for processing 24 and a means for comparing 25 the electronic signals and the identification data contained in the database, Consequently, in case of a match, the services 30 of the virtual casino are immediately accessible to the gambler 11.

Preferably, microprocessor 104 and encryption means 103 are designed so that the acoustic signal 20 varies for each operation. Indeed, encrypting an ID code means converting it into a series of data, incomprehensible to, everyone, and that only the owner of the encryption key will be able to decrypt. However, by no means does this prevent the encrypted ID code from being copied, either during its acoustic transmission (recorder) or by pirating the telephone line. Such a copy, improperly used by a defrauder, the receiving system will treat it as having all the characteristics of the original, and it will then be interpreted in order to verify the identifiers of the card.

Therefore, the problem that arises is how can any reproduction attempt be made impossible? Hereinafter, we will describe various alternative embodiments of the general means which allows distinguishing the original from the copy, during the analysis of the encrypted signal received by the computer means 21, by inserting a distinctive element into the DTMF type signal 20 emitted by card 10.

One of the alternatives consists in using a function called time dating (e.g., as described in U.S. Pat. No. 4,998,279). This time dating function makes use of the constantly changing "time" parameter. Thus, the "copy" is delayed when it is emitted. Such a solution requires synchronization between the emission means 13 and the computer means 21. For this purpose, both must have a "time base" and a "frequency standard". These two time bases have their own precision and their own drift. The result is that they are desynchronizing slowly but gradually. In view of solving this technical problem, a certain drift is tolerated between the time bases of the emission means 13 and the computer means 21. As this drift increases, the uncertainty about the "validity" of the information received and the risk of fraud also increases. Thus, if a drift of one minute is tolerated, the analysis system in the computer means 21 will consider that an illegal copy of the encrypted signal emission is valid if it is reused fraudulently within the next 30 seconds.

Another alternative consists in using incremental lists (e.g., as described in U.S. Pat. No. 4,928,098). The emitting device and the reception device have an ordered list of the successive identification code encryptions or else have algorithms that can be used to prepare them as time goes on. At a given instant, computer means 21 is waiting for the encrypted result C(n). If it actually receives the message C(n), it validates the operation. But the computer means 21 can receive a different message, indeed the user of the card may have activated its emission means 13 several times, for fun, by mistake, so that the card is in the situation of emitting the encrypted result C(n+p) at its next utilization with the computer means 21. If the computer means 21 receive a different message, they search ahead in the list of successive encrypted results whether there is a message C(n+p) identical to the one received. To dispel the ambiguity between "is this an authentic message emitted by the originator?" or "is this a fraudulent message?", the solution consists in asking and waiting for the next emitting. If it is then identical to C(n+p+1), the system validates the message and starts to wait for the next message, in state C(n+p+2). If it is different, the message is not validated and the analysis system continues to wait for the message C(n). Such an alternative embodiment is not very ergonomical as it obliges the card holder to activate the card several times.

According to a preferred alternative embodiment, to distinguish the original signal from its copy, the microprocessor 104 on board card 10 comprises an incremental counter 105. Each time the card is used, the incremental counter 105 increments by one or several units. Obviously, like a ratchet wheel, it cannot go backwards, it can only progress every time it is used.

Figure 2:
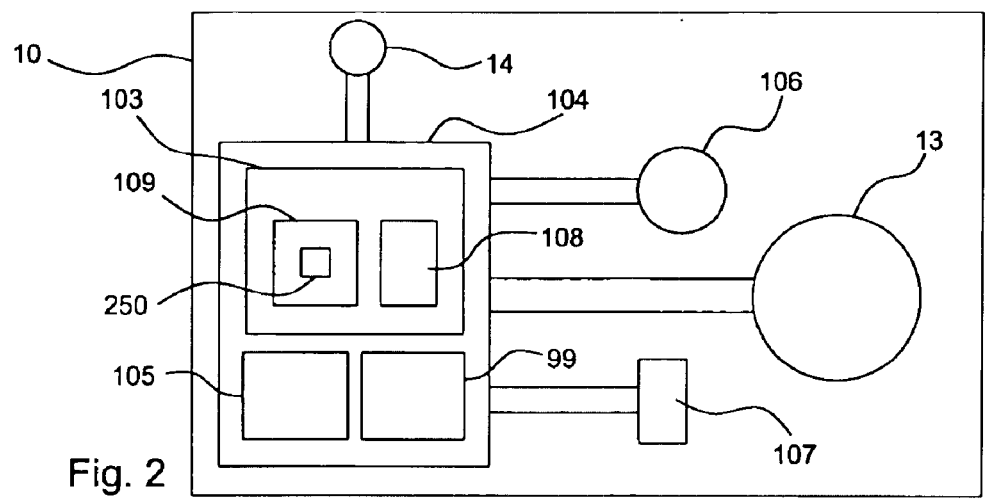
FIG. 2 shows the card in the form of a block diagram.
Figure 3:
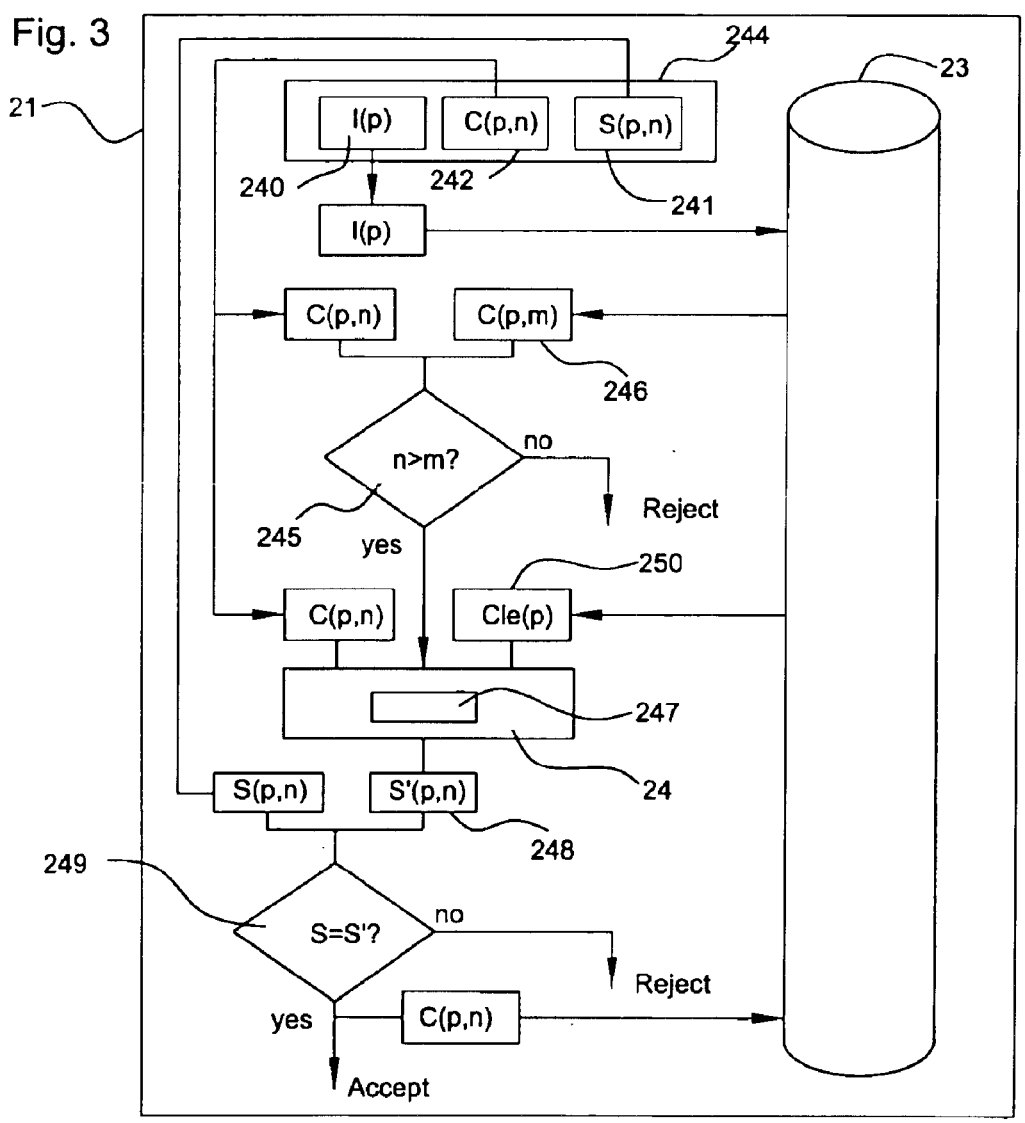
FIG. 3 shows the algorithm for verifying the authenticity of the transmitted signal.

In the case of this alternative embodiment, the state C(p,n) 242 of counter 105 is integrated into the calculation of the encrypted message 244 emitted by the emission means 13. The encoded part S(p,n) 241 is calculated by algorithm 108 (the equivalent algorithm 247 of which is stored in the computer means 21) by means of the secret key 250 specific to each card and the state C(p,n) 242 of counter 105. In addition to the ID number I(p) 240 of the card and the encrypted ID code S(p,n) 241, card 10 emits the state C(p,n) 242 of its incremental counter 105 at each emitting. Computer means 21 stores 230, in database 23, the state C(pnn) 242 of the incremental counter 105 when the last operation is validated. Thus, at each message receipt 244, the comparison means 25 of computer means 21 can compare 245 the information received concerning the state C(p,n) 242 of counter 105, to the preceding information received C(p,m) 246 and kept in memory 230, 23.

a) If the state C(p,n) 242 of counter 105 (FIG. 2) expressed in message 244 is strictly greater (n>m) than that of C(p,m) 246 received previously, then message 244 is accepted and the analysis continues.

b) If the state C(p,n) 242 of counter 105 expressed in message 244 is less than or equal (n£m) to that of C(p,m) 246 received previously, then the message is refused. The message received can only be a copy made earlier or a computer artifice.

If the conditions defined under item a) above are fulfilled, the computer means 21 enables to read the fixed part I(p) 240 and to search its own database 23, 230 for the secret key corresponding to the card. The calculation means 239 of the processing means 24 is then able, using algorithm 247, counter state C(p,n) 242 and secret key Clé (p) 250, to proceed to calculating the encrypted code expected by computer means 21. The encrypted code S'(p,n) 248 thus calculated is compared 249 to the one actually received S(p,n) 241, by the comparison means 25. This method and means therefore enable to validate or invalidate the message 244 without the user of the card having to activate it several times, as is the case in the alternative embodiment described above.

The existence of an incremental counter 105 in card 10 can define the maximum number of times the card can be used when the card is being individually programmed, at no additional cost. Once this maximum has been reached, the card no longer emits consistent messages and is therefore refused by the computer means 21.

The emitted frame 244 contains the following for a given card (p),
- a fixed part I(p) 240 (the card identification number),
- a variable incremental part C(p,n) 242 (the state of the counter),
- a variable part S(p,n) 241 apparently random (the result of an encryption algorithm 108 on the secret key 250 specific to this card (p)).

The frame emitted
- is always different on each different card,
- for the same card, is always different on each emission.

For a given card (p), computer means 21 can:
- read the fixed part I(p) 240 (the card identification number),
- search its own database 23 for the secret key 250 of this card and the last record received of the state C(p,m) 246 of the counter 105 of this card,
- refuse this frame 244 if the counter state C(p,n) 242 of the current operation is less than or equal to that of C(p,m) 246 received previously and continuing the verification of the current operation if the state C(p,n) 242 is strictly greater than that of C(p,m) 246 received previously,
- "decrypt" the message 244 received and validating its contents, recalculating by means of the encryption algorithm 247, the specific key 250 of this card and the counter state C(p,n) 242, then comparing the result of this calculation to the message received.

Thus, thanks to this combination of means it is possible to emit, by means of a credit-card sized card, DTMF type acoustic identification frequencies, that can be received by the microphone of hardware linked to the telephone network, and to be sure of the authenticity of the calling card and thus dismiss all defrauders using a sound or electronic recording or any kind of computer artifice.

In view of increasing the security of the system, in the alternative embodiment represented in FIG. 1, the computer means 21 further comprises a second comparison means 26. This comparison means enables to compare a gambler's 11 personal confidential code, contained in the database, to the confidential code emitted by the gambler. This code is emitted by means of a keypad 27 linked to the handset 16 and/or card 10 and transmitted to the computer means 21 of the virtual casino, via the communications network 15.

Thus, the virtual casino is sure that the caller 11 is actually the person authorized to get in touch with its services. A stolen card cannot be used by the thief because he does not know the confidential code.

In another alternative embodiment, also in view of reinforcing the security of the system and avoiding that the gambler can question the order he placed with the virtual casino, the system according to the invention is such that:
- card 10 emits, when it is activated 14 by the gambler, an encrypted acoustic signal validating the orders placed by the gambler 11,
- said software means 21 comprises means for detecting 21a and recording 21b the validation signal.

Thanks to this system, the gambler has validated, with an electronic signature, the order he has placed with the virtual casino.

Advantageously, in this case, the computer means further comprises means for emitting 28 an acknowledgement of receipt 29 for the orders placed. This acknowledgement of receipt is sent to the gambler 11.

What is claimed is:

1. A method enabling the gamblers (11) of a virtual casino to access, securely and rapidly, by mean of a microphone (17) linked to a communication network (15), the different games the virtual casino (12) offers to its gamblers (11), said method comprising the following steps:

the virtual casino (12) supplies to each of its gamblers (11) a credit-card sized card (10), customized with specific identifiers for each card and each gambler, said card (10) issues short ID audio signals, of DTMF type, encrypted at least partially, varying for each transaction, when it is activated through element (14) by the gambler (11), said card (10):
further counts (105) the number of times C(p,n) (242) it is activated by the element (14) and issues said ID audio signals (20), wherein C(p,n) takes account of all activations, including activations at a wrong time, issues audio signals (20) representative of the number of times C(p,n) (242) it has been activated, encrypts (103) the ID audio signals (20) into a function S(p,n) as a function of said number of times C(p,n) (242) the said card has issued said ID audio signals and as a function of said specific identifiers of each card and each gambler, said ID audio signals are received through the microphone (17) and transmitted via the communication network (15) to the computer facility (18) of the virtual casino, the signals transmitted to the computer facility (18) and the specific identifiers of the gambler and the card, held by the computer facility (18), are processed (24) and compared (25) electronically by the computer facility (18) of the virtual casino (12), by computer means (21) which:

store (230) the number of times C(p,m) (246) the card has been used at a time of a last validation operation, compare (245) the number of times C(p,n) (242) the card has been activated, at the time of the current transaction, to the number of times stored C(p,m) (246), reject the current transaction if C(p,n) (242) is less than or equal to C(p,m) (246) and continue with the verification of the current transaction if C(p,n) (242) is greater than C(p,m) (246), recalculate (239) the ID audio signals (20) into a function S'(p,n) as a function of said number of times C(p,n) (242) that said card has issued said ID audio signals (20) and as a function of said specific identifies of each card and each gambler, then compare S'(p,n) to S(p,n), so that in case of a match, the games of the virtual casino are immediately accessible to the gambler.

2. A method according to claim 1, further comprising the following step:

the gambler (11) issues a confidential code using a keyboard (27) linked to the microphone and/or card (10), after transmission to the computer facility (18) of the virtual casino, via the communication network (15), this confidential code is processed and compared (26) to the gambler's personal confidential code held by the computer facility of the virtual casino.

3. A method according to claim 1, further comprising the following step:

the gambler (11) places orders with the virtual casino, the orders the gambler (11) placed with the virtual casino are validated by the gambler activating (14) the card (10) so that it issues an encrypted validation audio signal, said validation signal is recorded (21b) by the computer facility of the virtual casino.

4. A method according to claim 3, further comprising the following step:
an acknowledgment of receipt (29) of the validation signal is sent to the gambler.

5. A system enabling the gamblers (11) of a virtual casino to access, securely and rapidly, the different games that the virtual casino offers to its gamblers, said system comprising:
a credit-card sized card (10), customized with specific identifiers for each card and each gambler, supplied to them, said card comprising:
  a means for issuing (13) short ID audio signals, of DTMF type, activated by the gambler of the virtual casino by means of an element (14) accessible from outside the card (10),
  an incremental counter (105) interconnected with the issuing means (13) and an encrypting means (103), incrementing at least by one unit as a function of the number of times C(p,n) (242) said element (14) has been actuated and that said card (10) bas issued said ID audio signals (20), wherein C(p,n) takes account of all activations, including activations at a wrong time,
  an encrypting means (103) interconnected with the incremental counter (105) and the issuing means (13) for encrypting at least partially and varying the ID audio signals into a function S(p,n) as a function of said number of times C(p,n) (242) that said card has issued said ID audio signals (20) and as a function of said specific identifiers of each card and each gambler,
a means for receiving and converting ID audio signal, namely a microphone (17) of a handset (16), into electronic signals that can be remote transmitted via a communication network (15),
a computer means (21), part of the computer ability of the virtual casino, connected to the communication network and located at a distance of the means for receiving the ID audio signals in the form of said electronic signal, said computer means comprising:
  a database (23) containing references of the cards (10) and the gamblers (11) and said specific identifiers of each card and each gambler,
  a means for processing (24) and a means for comparing (25) the electronic signals and said specific identifies of each card and each gambler contained in the database,
  a means for storing (230) the number of times C(p,m) (246) the card has been used at a time of a last validation operation,
  a means for comparing (245) the number of times C(p,n) (242) the card has been activated, at the time of the current transaction, to the number of times stored C(p,m) (246), so that the verification of the current transaction is rejected if C(p,n) (242) is less than or equal to C(p,m) (246) and continues if C(p,n) (242) is strictly greater than C(p,m) (246),
  a means for recalculating (239) the ID audio signals (20) into a function S'(p,n) as a function of said number of times C(p,n) (242) that said card has issued said audio signals (20) and as a function of said specific identifiers of the subscribers en the cards, and
  a means for comparing S'(p,n) to S(p,n) so that in case of a match, the games of the virtual casino are immediately accessible to the gamblers.

6. A system according to claim 5, said computer means further comprising:
a second means for comparing (26) a gambler's personal confidential code, contained in the database, to a confidential code issued by the gambler by means of a keyboard (27) linked to the handset and/or the card and transmitted to the computer means (21) of the virtual casino, via the communication network (15).

7. A system according to claim 5,
said card (10) further issuing, when it is activated by the gambler of the virtual casino, an encrypted audio signal validating orders placed by the gambler,
said computer means further comprising:
  a means for detecting (21a) and a means for recording (21b) the validation signal.

8. A system according to claim 7,
said computer means further comprising:
  a means for issuing (28) an acknowledgement of receipt of the orders placed, to be sent to the gambler.

* * * * *